United States Patent
Rizzo et al.

(10) Patent No.: US 11,748,837 B2
(45) Date of Patent: Sep. 5, 2023

(54) CARGO BOOKING MANAGEMENT SYSTEMS AND METHODS

(71) Applicant: Qatar Foundation for Education, Science and Community Development, Doha (QA)

(72) Inventors: Stefano Rizzo, Doha (QA); Ji Lucas, Doha (QA); Zoi Kaoudi, Doha (QA); Jorge-Arnulfo Quiane-Ruiz, Doha (QA); Sanjay Chawla, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 330 days.

(21) Appl. No.: 16/866,073

(22) Filed: May 4, 2020

(65) Prior Publication Data
US 2020/0364818 A1 Nov. 19, 2020

Related U.S. Application Data

(60) Provisional application No. 62/847,439, filed on May 14, 2019.

(51) Int. Cl.
*G06Q 50/28* (2012.01)
*G06F 16/23* (2019.01)
(Continued)

(52) U.S. Cl.
CPC ......... *G06Q 50/28* (2013.01); *G06F 16/2379* (2019.01); *G06N 5/04* (2013.01);
(Continued)

(58) Field of Classification Search
CPC ........ G06Q 50/28; G06Q 10/02; G06Q 10/04; G06Q 10/08
(Continued)

(56) References Cited

U.S. PATENT DOCUMENTS 10,661,902 B1 * 5/2020 Tavshikar ............. B64D 11/00
                                                          701/3
2006/0015396 A1    1/2006 Blomeyer
(Continued)

OTHER PUBLICATIONS

Abdulhakim A. Qahtan, "FAHES: A Robust Disguised Missing Values Detector", Aug. 19-23, 2018, Association for Computing Machinery, The 24th ACM SIGKDD International Conference on Knowledge Discovery and Data Mining, pp. 2100-2109. (Year: 2018).*

(Continued)

*Primary Examiner* — Resha Desai
*Assistant Examiner* — Ismail A Manejwala
(74) *Attorney, Agent, or Firm* — K&L Gates LLP

(57) ABSTRACT

The present disclosure provides a cargo revenue management system and method that increases the efficiency of cargo revenue management by increasing the prediction accuracy of cargo volumes that customers will tender in order to generate more efficient decisions to accept or reject cargo bookings. The provided system accomplishes this increased efficiency by identifying cargo volumes that customers arbitrarily book when an actual volume is unknown as disguised missing values and deemphasizing such values in the prediction of a cargo volume that will be received. The provided system additionally utilizes machine-learning models trained on a combination of features to predict a cargo volume that will be received for a particular cargo booking. Based on the predicted cargo volume that will be received, the system generates a decision of whether to accept or reject the cargo booking to maximize revenue generation.

16 Claims, 7 Drawing Sheets

(51) Int. Cl.
*G06N 20/00* (2019.01)
*G06Q 10/02* (2012.01)
*G06N 5/04* (2023.01)
*G06Q 10/04* (2023.01)
*G06Q 10/0631* (2023.01)
*G06Q 10/0637* (2023.01)

(52) U.S. Cl.
CPC ............. *G06N 20/00* (2019.01); *G06Q 10/02* (2013.01); *G06Q 10/04* (2013.01); *G06Q 10/06312* (2013.01); *G06Q 10/06375* (2013.01)

(58) Field of Classification Search
USPC ............................................. 705/5, 28, 7.31
See application file for complete search history.

(56) References Cited

U.S. PATENT DOCUMENTS

| | | | | |
|---|---|---|---|---|
| 2006/0041463 A1* | 2/2006 | Yoshida | ............... | G06Q 10/087 705/7.31 |
| 2012/0310680 A1 | 12/2012 | Bourla | | |
| 2016/0140455 A1* | 5/2016 | Dohm | .................... | G06Q 10/02 705/5 |
| 2016/0140483 A1 | 5/2016 | Dohm et al. | | |
| 2018/0374021 A1* | 12/2018 | Drayton | .................... | G06N 5/04 |
| 2019/0005028 A1* | 1/2019 | Mago | .................. | G06F 16/3344 |
| 2019/0042369 A1* | 2/2019 | Deutsch | ............. | G06F 11/1048 714/768 |
| 2019/0244318 A1* | 8/2019 | Rajcok | ................... | G06Q 50/30 705/13 |
| 2019/0311031 A1* | 10/2019 | Powell | .................. | G06F 40/232 704/9 |
| 2019/0392363 A1* | 12/2019 | Kohli | ...................... | G06Q 50/04 |
| 2020/0193351 A1* | 6/2020 | Patel | ............... | G06Q 10/06393 707/748 |
| 2020/0334622 A1* | 10/2020 | Uehara | ................ | G06Q 10/087 705/28 |

OTHER PUBLICATIONS

Zohar Feldman, Proactive Event Processing in Action: A Case Study on the Proactive Management of Transport Processes (Industry Article), Jun. 29, 2013 (Year: 2013).*

European Search Report for related European Application No. 20174272.3; dated Jun. 15, 2020; (8 pages).

* cited by examiner

CARGO BOOKING MANAGEMENT SYSTEMS AND METHODS

PRIORITY CLAIM

The present application claims priority to and the benefit of U.S. Provisional Application 62/847,439, filed May 14, 2019, the entirety of which is herein incorporated by reference.

BACKGROUND

The revenue of commercial airlines is primarily derived from sales of passenger tickets and cargo (freight) shipments. While most modern airlines have implemented sophisticated data-driven passenger revenue management systems, particular difficulties arise for doing the same for cargo shipments. The air-cargo ecosystem is complex and involves several players including shippers, freight forwarders, airline customer, and end-customers. Overall, five fundamental differences may be highlighted between passenger and cargo revenue management.

First, in the case of passenger revenue, the unit of sale is an airline seat, which is static. In the case of cargo, however, there is substantial variability in both volume and weight of cargo shipments. Further, the revenue from a cargo shipment often depends on the nature of the cargo. For example, perishable and non-perishable shipments generate different marginal revenues. Accordingly, the unit of sale in cargo is highly dynamic.

Second, a large chunk of air cargo capacity is pre-booked by freight forwarders who tend to overbook and release capacity closer to the date of departure. The ecosystem of air-cargo management is such that there is no penalty for overbooking. Additionally, some portion of cargo space is also reserved for mail and passenger baggage. Thus, the effective capacity available for cargo is called the "free sale", which can vary up to departure day.

Third, for cargo shipments, what matters is the source and destination. How the cargo is routed from source to destination is less of a concern as long as it reaches the destination on time. Rerouting, however, has ancillary costs as the shipment has to be stored in a warehouse.

Fourth, a unique aspect of the air-cargo ecosystem is that there is often a substantial discrepancy between the space booked by a shipping agent (in terms of volume and weight) for a particular item and the actual quantity that arrives on or just before the departure day. Airlines therefore tend to overbook flights under the assumption that the quantity that will arrive will be less than what was booked. Overbooking often leads to offloading, which increases costs in terms of storage and rerouting. Additionally, it is a conventional practice in the industry that airlines will not charge for the above-described discrepancy, which makes it difficult for airlines to manage their shipment capacity that is perishable in the sense that once a flight takes off no additional cargo may be added. Overall, this aspect of the air-cargo ecosystem creates inefficiencies in the market.

Fifth, passenger capacity is determined by a quantity of seats whereas cargo capacity is often volume-constrained. Moreover, an aircraft will reach volume capacity before it reaches weight capacity. Volume estimations tend to be less accurate than weight estimations, which adds difficulty to airlines managing their booked capacity prior to departure day.

Due to these fundamental differences, air-cargo management requires not only accurately predicting the quantity (e.g., weight and volume) of items that will be tendered by departure, but also requires making decisions on whether to accept or reject a particular booking for a flight. Such predictions and decision-making in the air-cargo setting, however, is challenging because data on booked cargo is often unreliable. Employees on cargo revenue teams often use their intuition to decide whether to accept a cargo booking for a flight or to reroute the cargo booking to a different flight. Accordingly, systems and methods for increasing the efficiency of selling cargo space, and therefore increasing revenue, are desired.

SUMMARY

The present disclosure provides new and innovative systems, methods, and non-transitory, computer-readable mediums that increase the efficiency of cargo revenue management. In an example, a system includes a processor in communication with a memory. The processor is configured to receive a cargo booking including a booked cargo volume and a booked cargo weight. The cargo booking is received a quantity of days until a cargo departure day. The processor is also configured to determine whether the booked cargo volume is a disguised missing value. The processor determines a predicted cargo volume of the cargo booking based on a set of features of the cargo booking. The set of features include at least whether the booked cargo volume is a disguised missing value, the booked cargo weight, and the quantity of days until the cargo departure day. The processor is further configured to generate a decision to accept or reject the cargo booking based in part on the predicted cargo volume.

In an example, a method includes receiving a cargo booking including a booked cargo volume and a booked cargo weight. The cargo booking is received a quantity of days until a cargo departure day. It is then determined whether the booked cargo volume is a disguised missing value. A predicted cargo volume of the cargo booking is determined based on a set of features of the cargo booking. The set of features include at least whether the booked cargo volume is a disguised missing value, the booked cargo weight, and the quantity of days until the cargo departure day. A decision is then generated to accept or reject the cargo booking based in part on the predicted cargo volume.

In an example, a non-transitory, computer-readable medium stores instructions. The instructions, when performed by a processor, cause the processor to receive a cargo booking including a booked cargo volume and a booked cargo weight. The cargo booking is received a quantity of days until a cargo departure day. The instructions further cause the processor to determine whether the booked cargo volume is a disguised missing value. The instructions also cause the processor to determine a predicted cargo volume of the cargo booking based on a set of features of the cargo booking. The set of features include at least whether the booked cargo volume is a disguised missing value, the booked cargo weight, and the quantity of days until the cargo departure day. The instructions further cause the processor to generate a decision to accept or reject the cargo booking based in part on the predicted cargo volume.

DETAILED DESCRIPTION

Cargo booking data that airlines collect is replete with errors and often unreliable, thus making it difficult for airlines to efficiently sell their cargo space without under- or over-booking. Under-booking leads to a loss of revenue that could have otherwise been had, whereas over-booking results in off-loading costs that decrease revenue. For instance, capacity is a perishable quantity for any flight. Once the flight takes off, the capacity is lost. However, flight capacity is also a finite quantity. Once the capacity of the flight is reached, no more cargo can be added to the flight. Therefore, an airline wants to accept bookings that will maximize revenue.

One source of error is that shippers coordinate with freight forwarders and airlines using various communication means including email, phone calls, instant messages, or SMS messages, which can increase the possibility of data entry errors. For instance, a received cargo booking may be transferred incorrectly somewhere along the chain from a customer to an intermediary freight forwarder to an airline and into a central system using the various communication means. In another instance, a cargo booking may inadvertently be duplicated by being communicated through more than one communication means. There may also be a lag time between a cargo booking being received and the cargo booking being entered into the central system, which can affect intervening orders during that lag time (e.g., seemingly available space is booked that is not actually available).

Figure 1:
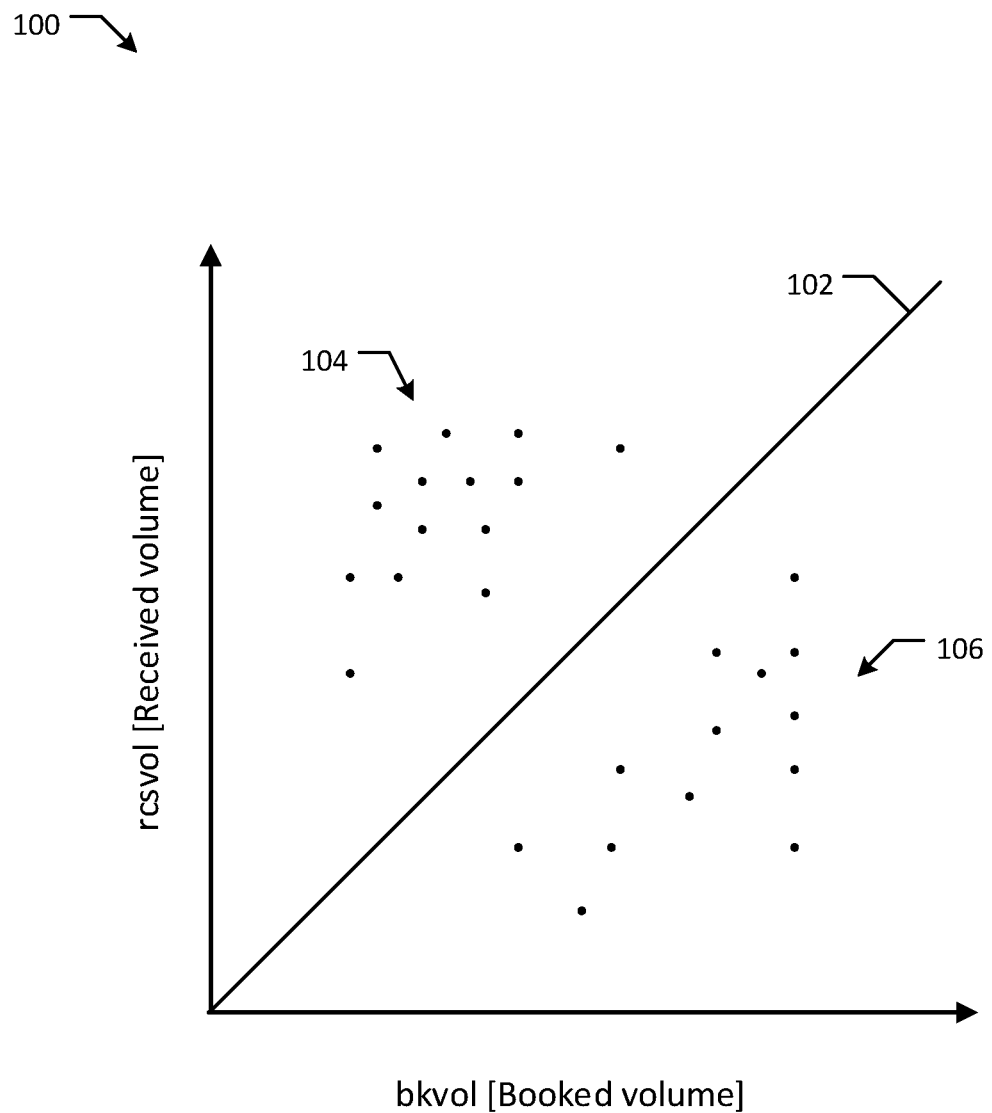
FIG. 1 illustrates a graph showing observed discrepancies between booked cargo volume and received cargo volume.

Another source of error is that customers often book arbitrary but fixed values of cargo volume when the customers do not know the actual cargo volume that they will deliver, instead of indicating that the volume is unknown (e.g., NaN value). These arbitrary values have no bearing on the cargo volume that will be received, but will be misinterpreted as valid booked values if there is nothing to indicate to the airline that the values should not be treated as such. Accordingly, airlines may make predictions of how much cargo volume is left for sale on a flight based on values that do not reflect how much volume will be delivered for a given order. FIG. 1 illustrates a graph 100 that represents the discrepancies the inventors have observed between booked cargo volume and received cargo volume when analyzing airline cargo data. The line 102 indicates a booked volume that equals a received volume. The inventors have observed many data points that deviate from the line 102 which are illustrated by a plurality of representative data points 104 and a plurality of representative data points 106.

As used herein, "disguised missing values" (DMVs) refer to unknown, inapplicable, or otherwise nonspecified data entries that are misinterpreted as valid data values. In the context of cargo booking, as stated above, DMVs may arise in cargo booking data when a customer does not know a cargo volume that the customer needs at the time of booking and instead submits an arbitrary cargo volume. For example, consider a set of six cargo bookings each having a booked volume of 10.23, but a received volume of 5.1, 2.8, 13.3, 26.4, 26.4, and 2.8, respectively. Unless other features can explain the diverse range of values for the received volume, the value 10.23 is very likely to be a DMV. One having skill in the art will appreciate the substantial effect that DMVs can have on data analysis outcomes, such as predictive machine-learning models.

For instance, the effect a DMV can have on a prediction may be seen by considering a linear regression model in a single dimension. Assuming a linear model y=wx is learnt from examples $(x_i, y_i)_{i=1}^n$, then the Equation 1 below is well known.

$$w = \frac{\sum_{i=1}^{n} x_i y_i}{\sum_{i=1}^{n} x_i^2} \quad (1)$$

Then, assuming $x_{dmv}$ and an associated set of values $\{y_1, y_2, \ldots, y_m\}$ are added to the training set, a new updated parameter $w_{new}$ may be obtained, which is shown as Equation 2 below.

$$w_{new} = \frac{\sum_{i=1}^{n} x_i y_i + x_{dmv} \sum_{j=1}^{m} y_j}{\sum_{i=1}^{n} x_i^2 + m x_{dmv}^2} = \frac{w + \frac{x_{dmv} \sum_{j=1}^{m} y_j}{\sum_{i=1}^{n} x_i^2}}{1 + \frac{m x_{dmv}^2}{\sum_{i=1}^{n} x_i^2}} \quad (2)$$

Depending upon the value of $\Sigma_i^m y_j$, the model might or might not be impacted by $x_{dmv}$. For instance, if $\Sigma_{j=1}^m y_j = m w x_{dmv}$, then substituting in the above equation shows that $w_{new} = w$ and the DMV has no impact on the model. However, if $$\frac{1}{m} \sum_i = y_j$$

deviates significantly from the straight line y=wx, the impact of $x_{dmv}$ can be large.

The presently disclosed cargo revenue management system and method increase the efficiency of cargo revenue management by increasing the prediction accuracy of cargo volumes that customers will tender in order to generate more efficient decisions to accept or reject cargo bookings. The provided system accomplishes this increased efficiency by identifying the above-described arbitrary, fixed booked values that customers book as disguised missing values and deemphasizing such values in the prediction of a cargo volume that will be received. The provided system additionally utilizes machine-learning models trained on a combination of features to predict a cargo volume that will be received for a particular cargo booking. Based on the predicted cargo volume that will be received, the system generates a decision of whether to accept or reject the cargo booking depending on whether the revenue from the booking and the value of accepting the booking outweigh the value of rejecting the booking. Accordingly, the presently disclosed system via the prediction models and decision generation helps increase the efficiency of the cargo revenue management process.

While the present disclosure is described in terms of air cargo, it should be appreciated that the provided systems and methods are also applicable, in some instances, to other forms of cargo transportation, such as ground transportation and sea transportation.

System Embodiment

Figure 2:
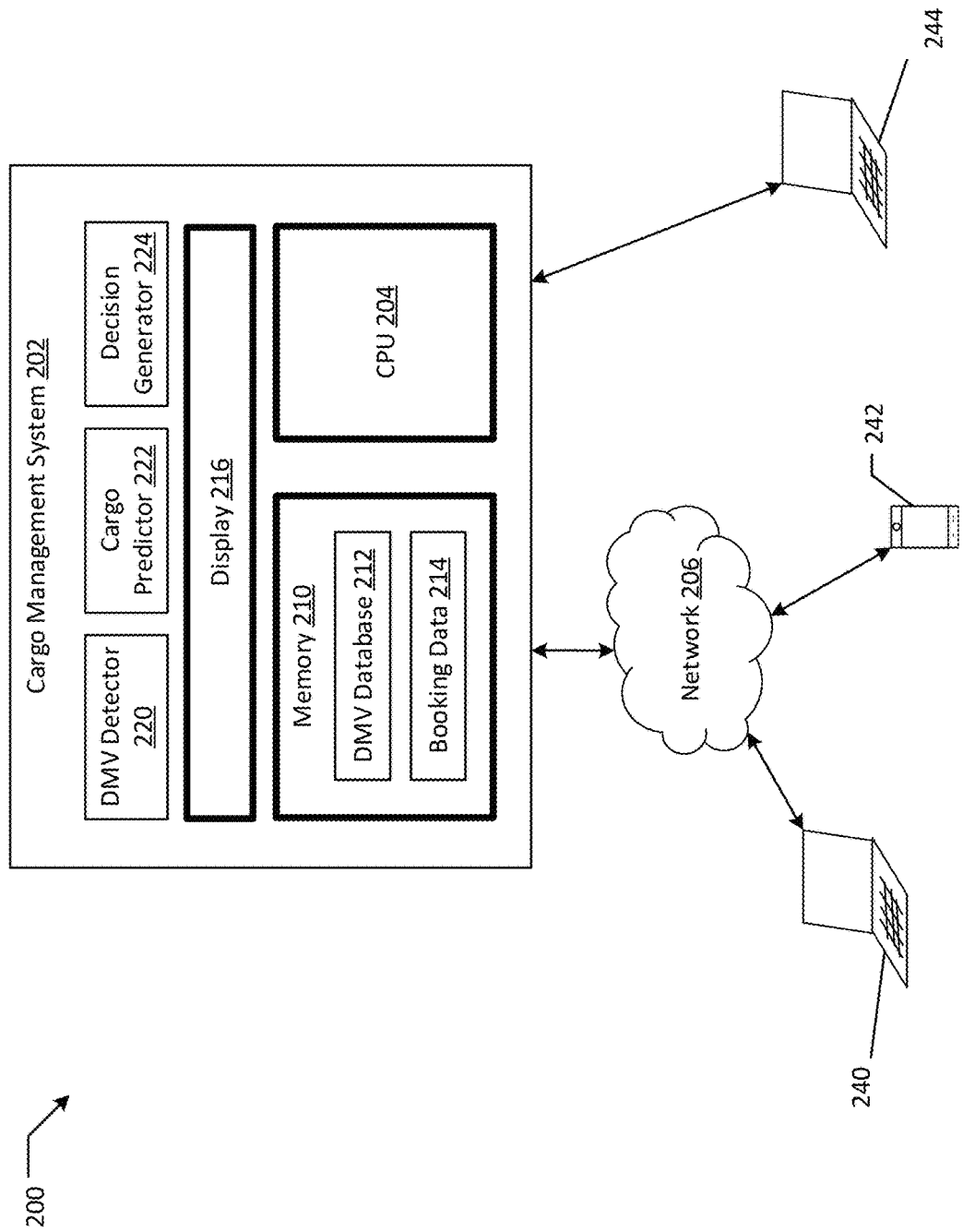
FIG. 2 illustrates a block diagram of a cargo booking system, according to an aspect of the present disclosure.

FIG. 2 illustrates a block diagram of an example cargo booking system 200. The cargo booking system 200 includes an example cargo revenue management system 202. One or more devices 240, 242, 244 may communicate with the cargo revenue management system 202 to submit cargo bookings. For example, a customer may submit a cargo booking to the cargo revenue management system 202 via the laptop 240 or the smartphone 242 over the network 206. The network 206 can include, for example, the Internet or some other data network, including, but not limited to, any suitable wide area network or local area network. In another example, a customer may communicate with a cargo management employee (e.g., over a phone call, email, text message, etc.) and the cargo management employee may submit the customer's cargo booking to the cargo revenue management system 202 via the laptop 244 over a wired connection. The laptop 244 may additionally or alternatively communicate with the cargo revenue management system 202 over the network 206.

The cargo revenue management system 202 includes a processor in communication with a memory 210. In some aspects, the cargo revenue management system 202 may include a display 216 so that cargo bookings and other information may be viewed on the display 216. In other examples, the components of the cargo revenue management system 202 may be combined, rearranged, removed, or provided on a separate device or server. The processor may be a CPU 204, an ASIC, or any other similar device. The memory 210 stores a DMV database 212 that includes identified DMVs. The DMV database 212 may be continually updated as new DMVs are identified based on received bookings. The memory 210 may also store booking data 214 that includes data on all cargo bookings received by the cargo revenue management system 202. For instance, the booking data 214 includes cargo volumes that have been received each time a particular booked volume has appearing in a cargo booking. This data may be used to identify DMVs as described below. In various instances, some or all of the booking data 214 may be stored on one or more separate servers in communication with the cargo revenue management system 202. The booking data 214 may be used to continually train the algorithms and models of the cargo revenue management system 202 described herein.

A DMV detector 220 of the cargo revenue management system 202 may be programmed to identify whether a received cargo volume booking is a DMV. For instance, the DMV detector 220 may compare the received cargo volume booking with identified DMVs in the DMV database 212. The DMV detector 220 may also be programmed to continually identify new DMVs from received cargo bookings and from the booking data 214. The DMV detector 220 may update the DMV database 212 with a newly identified DMV that is not already in the DMV database 212. The DMV detector 220 may be implemented by software executed by the CPU 204.

The cargo revenue management system 202 may also include a cargo predictor 222 that is programmed to predict a cargo volume that will be received for a particular cargo booking. The predicted cargo volume may be determined via a machine-learning model trained on various features, as will be described in more detail in connection with FIG. 3. The machine-learning model of the cargo predictor 222 may be continually trained via the booking data 214. The cargo predictor 222 may be implemented by software executed by the CPU 204.

A decision generator 224 of the cargo revenue management system 202 may be programmed to generate a decision of whether to accept or reject a received cargo booking. The generated decision is based on the predicted cargo volume. The generated decision may also be based on an expected revenue of accepting the cargo booking, a value of accepting the cargo booking, and a value of rejecting the cargo booking. This will be described in more detail in connection with FIG. 3. In some aspects, the decision generator 224 may be programmed to generate an actionable decision that is displayed on the display 216. Stated differently, the actionable decision is a suggestion for an operator to accept or reject a particular cargo booking, which the operator may do by interacting with the actionable decision. In other aspects, the decision generator 224 may be programmed to automatically accept or reject a particular cargo booking based on the decision that is generated. The decision generator 224 may be implemented by software executed by the CPU 204.

Method Embodiment

Figure 3:
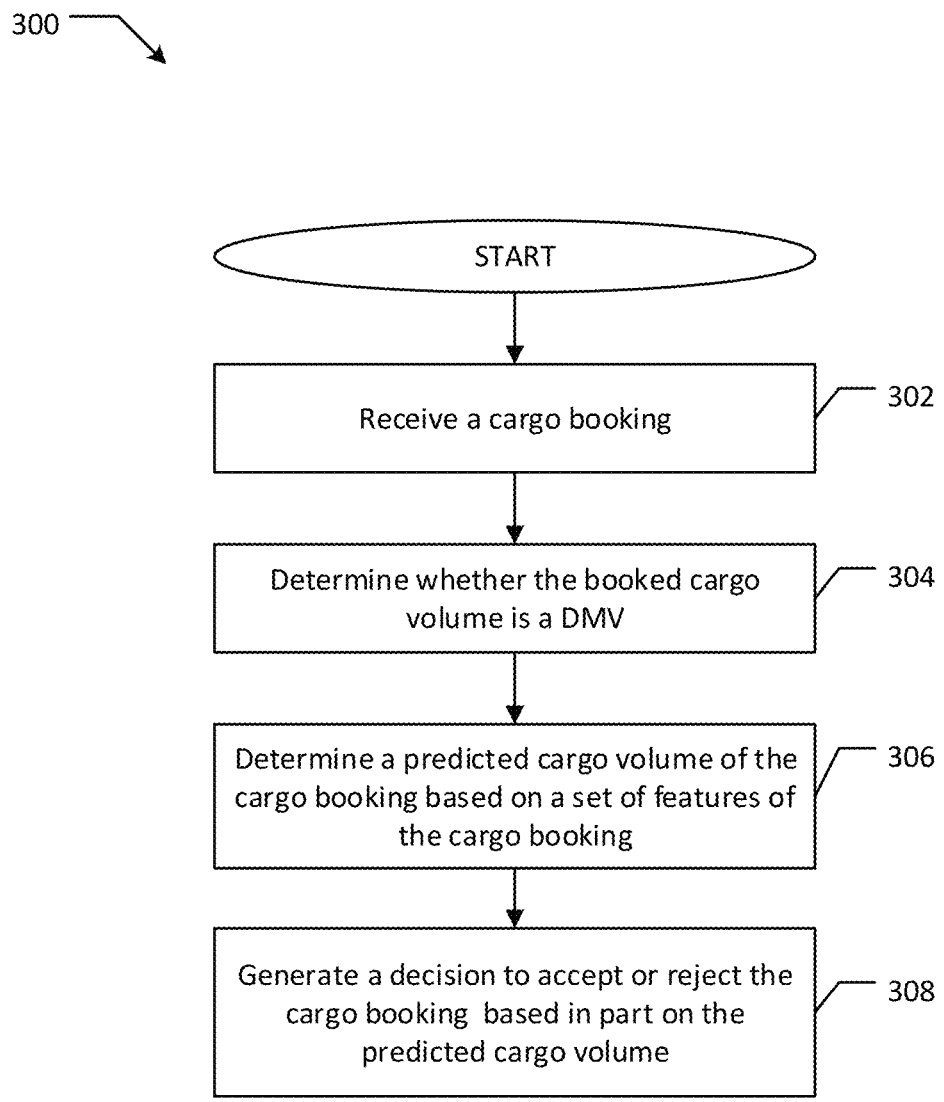
FIG. 3 illustrates a flow chart of a cargo revenue management method, according to an aspect of the present disclosure.

FIG. 3 illustrates a flow chart of a cargo revenue management method 300, according to an aspect of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The method 300 may include receiving a cargo booking (block 302). For example, the DMV detector 220 may receive the cargo booking. The cargo booking is received a quantity of days until a cargo departure day. The cargo departure day is when a cargo shipment departs its origin for its destination. For example, the day a flight takes off, a truck leaves, or a ship departs its dock. No additional cargo may therefore be added to a shipment after the cargo departure day. The cargo booking includes information pertaining to the booking. For instance, the cargo booking includes a booked volume (e.g., $m^3$ or $ft^3$) of the cargo and a booked weight (e.g., lbs or kgs) of the cargo. The cargo booking may also include a quantity of items in the booked cargo, a shipment code, a cargo type, a cargo destination, and/or a cargo origin. In an example, the DMV detector 220 receives a cargo booking three days from the departure day that includes a booked volume (e.g., 10 m³) and a booked weight (e.g., 50 kg).

It may then be determined whether the booked cargo volume is a DMV (block 304). For example, the DMV detector 220 may compare the booked volume (e.g., 10 m³) of the received cargo booking with the identified DMVs in the DMV database 212. If the value of the booked volume matches one of the identified DMVs in the DMV database 212, then the DMV detector 220 flags the booked volume as a DMV. If the booked volume does not match one of the identified DMVs, then it may be determined whether the booked volume is a newly identified DMV.

One method to identify whether a booked volume is a DMV is to consider a deviation of an average received volume for a particular booked volume from the particular booked volume. Stated differently, each cargo booking includes a cargo volume that was booked and a cargo volume that was received, and multiple cargo bookings over time may have the same particular booked cargo volume. Analyzing how an average of the received cargo volumes deviates from that particular booked cargo volume may help identify that the booked cargo volume is an arbitrary number that customers enter (e.g., a DMV) if the deviation is large enough.

For instance, returning to the example including a set of six cargo bookings each having a booked volume of 10.23, but a received volume of 5.1, 2.8, 13.3, 26.4, 26.4, and 2.8, respectively, the average of the received volumes is 12.8. The deviation $g_1$ may then be determined according to Equation 3 below to obtain 6.60. In Equation 3, $u_i$ is the particular booked cargo volume, $v_{i,k}$ is a respective received cargo volume for the particular booked cargo volume, and $n_i$ is a quantity of received cargo volumes for the particular booked cargo volume. The determined deviation may then be compared to a predetermined threshold to determine whether the deviation is large enough to identify a DMV.

$$g_1(u_i) = \left(\frac{1}{n_i}\sum_{k=1}^{n_i} v_{i,k} - u_i\right)^2 \quad (3)$$

Another method to identify whether a booked volume is a DMV is to consider an entropy of the received cargo volumes for a particular booked volume. The entropy of the values is a measure of the order or predictability of the values. For instance, the higher the entropy of the received cargo volumes, the greater the unpredictability of the received cargo volumes, and the more likely it is that the particular booked volume is a DMV. In some examples, the entropy may be normalized, such as to upperbound the entropy at one. The normalized entropy $g_2$ may be determined according to Equation 4 below, in which $V_i$ consists of K distinct elements and $V_{i,k}$ is the the k-th bucket of $V_i$. Moreover, $u_i$ is the particular booked cargo volume, $V_i$ is a set of received cargo volumes for the particular booked cargo volume, K is a quantity of distinct elements of $V_i$, and $n_i$ is a quantity of received cargo volumes for the particular booked cargo volume. The determined entropy may then be compared to a predetermined threshold to determine whether the entropy is sufficient to identify a DMV.

$$g_2(u_i) = \frac{-\sum_{k=1}^{K} p_k \log p_k}{\log n_i}, \text{ where } p_k = \frac{|V_{1,k}|}{|V_i|} \quad (4)$$

In various aspects, a booked value is identified as a DMV only upon both $g_1$ exceeding its predetermined threshold and $g_2$ exceeding its predetermined threshold. In other aspects, a booked value is identified as a DMV upon $g_1$ or $g_2$ exceeding its predetermined threshold. It should be noted that prior cargo booking data (e.g., included in the booking data 214) may be analyzed according to the same methods to identify DMVs and populate the DMV database 212 with identified DMVs (e.g., FIG. 4). Once a booked volume is identified as a DMV, the value of the booked volume may be deemphasized when predicting a volume that will be received in subsequent instances in which the booked volume is received.

A predicted cargo volume of the cargo booking may then be determined based on a set of features of the cargo booking (block 306). For example, the cargo predictor 222 may determine a predicted cargo volume (e.g., 8 m³) for the booked cargo volume (e.g., 10 m³) that was received. The predicted cargo volume may be determined based on a machine-learning regression model $f_\theta:X\rightarrow R^+$, in which X is feature set, each booking i is mapped as an element $x_i \in X$, and each received booking volume is mapped as $y_i \in R^+$. In some instances, the model is built using gradient boosting machines. In other instances, the model is built using random forests. Gradient boosting machines are ensemble methods and are known to perform well "out of the box". They can also easily handle a mixture of datatypes including numeric and categorical data. Random forests may reduce error by reducing variance as they combine independently generated deep trees on bootstrapped samples. Gradient boosting machines, however, reduce the bias by building shallow trees in a sequential manner, where each subsequent tree is trained by using the dependent variable as the residuals of the previous one.

The inventors have found that building the prediction model using gradient boosting machines may produce better predictions for purposes of the cargo revenue management method 300. For example, even though the prediction model is trained to make predictions at the booking level, the primary interest is in making flight level predictions (e.g., the total cargo volume of the flight is maximally utilized to maximum revenue), which are an aggregation of booking level predictions. Therefore, while gradient boosting machines predictions fluctuate more and individual predictions are further from the actual value, the differences cancel each other out at the flight level. Stated differently, the aggregation of bookings at the flight level will automatically result in variance reduction. The inventors have found in one evaluation that, on the booking level, the variance in gradient boosting machine predictions was more than five times higher than random forest predictions. At the flight level, however, the mean absolute error of random forest predictions was 87.1% higher than the gradient boosting machine prediction error. For these reasons, building the prediction model using gradient boosting machines may be preferable in some instances, though not limiting. In other instances, the prediction model may be built on other suitable machine-learning models.

The prediction model may be built having various features of a cargo booking in the feature set. In one example, the feature set includes whether the booked cargo volume is a DMV, the booked cargo weight, and the quantity of days until the cargo departure day. If a booked cargo volume is flagged as a DMV, then the prediction model deemphasizes the value of the booked cargo volume. Contrary to booked cargo volume, which usually tends to be a DMV, booked cargo weight can be valuable information. This is because shipping agents have more accurate information with respect to cargo weight since they have access to high quality weighing machines. Conversely, instruments for accurately measuring cargo volume are not readily available for many shipping agents. Thus, because it is easier to measure cargo weight, the booked cargo weight is on average more precise than the booked cargo volume.

The quantity of days until the cargo departure day may be included because the inventors have found that bookings closer to the departure day tend to be more accurate. In fact, the inventors have found that bookings that are timestamped several days before departure day tend to show a clear pattern of overbooking from the customer side (e.g., using DMVs). Therefore, the quantity of days until the cargo departure day may be the most important feature for predicting cargo volumes that will be received. One explanation is that it is natural for shippers to overbook since in the air-cargo business there is no penalty for overbooking, and shippers would rather have booked too much space than not enough.

In other aspects, the feature set may include one or more other features, including but not limited to a quantity of items in the booked cargo volume, the booked cargo volume, a shipment code, a cargo type, a cargo destination, and a cargo origin. The quantity of items in the booked cargo volume may be valuable to include in the prediction model because received cargo volumes tend to differ from booked cargo volumes not because a volume of an item was different, but rather because the quantity of items received is more or less than what was booked. Thus, the quantity of items in the booked cargo volume may be useful for predicting possible outcomes of cargo volumes that will be received. For example, if two pieces were booked having a volume of 12 $m^3$, with a volume for each piece of 6 $m^3$, it is unlikely that a single piece will be split and the received volume will become 4 $m^3$. It is in fact much more likely that the received cargo volume may be 6 $m^3$, 18 $m^3$, or 24 $m^3$.

The booked cargo volume, while in many instances a DMV, can still be valuable to include in the prediction model. This is because, when the booked cargo volume is not a DMV, the booked cargo volume tends to be precise. A cargo type refers to a type of product that the cargo is, such as fresh food, pharmaceuticals, electronics, etc. Various patterns with respect to particular cargo types may be observed and included in the prediction model. A shipment code is one or more codes that instruct how a shipment must be handled, e.g., live animals or perishables. The shipment code feature may replace or complement the product type feature. The shipment code may be encoded as a binary vector with one element for each shipment code (e.g., one-hot encoding).

A cargo destination (e.g., where the cargo is going) may be included in the prediction model because, in some instances, while the cargo destination is a weak predictor for a volume that will be received, the cargo destination may help elicit subtypes within cargo types, which may help reduce variance in predictions. Similarly, the cargo origin (e.g., where the cargo is leaving from) is a weak predictor for a volume that will be received. The cargo origin, however, may help to capture the average behavior of booking agents from a particular origin, which may help reduce variance in predictions. Accordingly, it may be valuable to include the cargo origin and destination as features in the prediction model.

The features included in the predication model's feature set may each be weighted differently with respect to their respective effects on the predicted cargo volume. For instance, each feature may be weighted according to the feature's importance (e.g., FIG. 5) in determining a predicted cargo volume.

A decision to accept or reject the cargo booking is then generated based on the predicted cargo volume of the cargo booking (block 308). For example, the decision generator 224 may generate a decision to accept or reject the cargo booking based on the cargo volume (e.g., 8 $m^3$) predicted by the cargo predictor 222. For any flight, capacity is a perishable quantity (e.g., once the flight takes off, capacity is lost). Therefore, the decision making problem can be seen as a generalization of the classic Knapsack problem with two caveats: (i) cargo bookings appear over time and (ii) the exact volume and weight of the shipment become available only at departure time. Accordingly, the decision to accept or reject a cargo booking may be modeled as a stochastic dynamic program.

To model an example stochastic dynamic program, a state vector $x=(x_i, \ldots, x_m)$ may first be defined. Each $x_i$ is the number of items of type i assigned to a flight. As stated above, a cargo type is a predefined category, such as fresh food or pharmaceuticals. The state vector x evolves with time t. A value function $VF(x,t)$ may be defined as the expected revenue from a flight given that at time t the flight is in state x. The departure day may be labeled as time $t=0$ and the booking horizon (e.g., a quantity of days until the departure day) extends up to time $t=T$. Accordingly, time flows backwards in this stochastic dynamic program. In this example, a single flight is modeled with volume capacity $k_v$ that is fixed and known. In other examples, a volume capacity of a flight may depend on factors beyond the size of an aircraft, such as for flights that are not strictly cargo flights but carry passengers as well. In such examples, the volume capacity $k_v$ varies based on passenger load for a particular flight.

Returning to the example stochastic dynamic program, time may also be discretized, and in each time bin t the probability of an item i being received for a booking is $p_{i,t}$. It can be assumed that at each time step only one shipment can arrive for booking. The probability that no booking will show up in time period t may be defined as $p_{0,t}=1-\Sigma_{i=1}^{m}p(i,t)$. In practice, when an agent books an item of type i, it is accompanied by a booked volume $bkvol_i$. When the item finally arrives for shipment, the received volume is $rcsvol_i$. The revenue received from the item i is $R(rcsvol_i)$, where $R( )$ is typically an increasing and concave function of volume. For instance, the more cargo volume that is received, the more payment that is received from customers, up until a volume capacity of an aircraft is reached. During booking time, the airline is only aware of the booked volume $bkvol_i$ and not the received volume $rcsvol_i$. A decision about whether to accept or reject a booking may therefore be based on an average volume of type i, $\bar{v}_i$. The value function $VF(x, t)$ may then be defined as a recursive function (Bellman's Equation) shown in Equation 5 below in order to maximize the overall expected revenue from a flight. The value function at the time of departure $VF(x, 0)$ may be defined as shown in Equation 6 below.

$$VF(x, t) = \sum_{i=1}^{m} p_{i,t} \max\{R(\overline{v}_i) + VF(x + e_i, t-1),$$

$$VF(x, t-1)\} + p_{0,t} VF((x, t-1)), \ t = 1, 2, \ldots, T \quad (5)$$

$$VF(x, 0) = -h_v \left[\sum_{i=1}^{m} x_i \overline{v}_i - k_v\right]^+, \text{ where } [a]^+ = \max\{a, 0\} \quad (6)$$

To further explain the value function, when the state is x at a given time t, then VF(x, t) is the expected revenue over the full time horizon of the booking. At time step t, the probability of a shipment of type i arriving is $p_{i,t}$. If the booking is accepted, then the state will transition to $x+e_i$, where $e_i$ is a one-hot binary vector with a 1 at the i-th location. By accepting the booking, the expected revenue is $R(\overline{v}_i)$. To maximize revenue, however, the booking of item i will only be accepted if the expected revenue plus the value of accepting the booking, e.g., $R(\overline{v}_i)+VF(x+e_i, t-1)$, is greater than the value of not accepting the booking and transitioning one step towards departure day while staying in the same state, e.g., VF(x, t−1). This revenue maximization decision rule D1V to determine whether to accept or reject an incoming shipment of type i may be defined as shown in Equation 7 below. At time t=0 and in state x, VF(x, 0) in Equation 6 captures the cost of off-loading, which is proportional (e.g., the proportional value $h_v$) to the total expected volume $\Sigma_i x_i \overline{v}_i$ minus the capacity $k_v$. For example, if the expected volume is 100 units and the capacity $k_v$ is 50 units, then the off-loading cost is −50$h_v$.

$$D1V{:}R(\overline{v}_i)+VF(x+e_i,t-1)>VF(x,t-1) \quad (7)$$

The prediction model described above for predicting a cargo volume that will be received may be integrated into the decision rule D1V to obtain the decision rule D2V shown in Equation 8 below. The prediction model is $f_\theta$ such that given a booked volume $bkvol_i$ of type i, $f_\theta(bkvol_i)$ is the predicted received volume ($\hat{rcsvol}_i$). In some examples, therefore, the decision to accept or reject the cargo booking is generated based on the decision rule D2V. For instance, the decision generator 224 may be programmed to generate a result of the decision rule D2V. If the expected revenue of the predicted cargo volume plus the value of accepting the predicted cargo volume of the booking, e.g., $R(f_\theta(bkvol_i))+VF(x+e_i, t-1)$, is determined to be greater than the value of not accepting the booking and transitioning one step towards departure day while staying in the same state, e.g., VF(x, t−1), then a decision is generated to accept the cargo booking. If the opposite is true, then a decision is generated to reject the cargo booking.

$$D2V{:}R(f_\theta(bkvol_i))+VF(x+e_i,t-1)>VF(x,t-1) \quad (8)$$

In some aspects, the value function may be modified to help limit or eliminate the effects of the curse of dimensionality of dynamic programming. In such instances, for example, suppose there are m items and the number of time periods is T. Then, the size of the state space is exponential in m. For instance, the size of the state space is S(T, m), Stirling number of second kind. An approximate solution to escape the exponential blow-up is to use aggregate $x=\Sigma_i x_i \overline{v}_i$. This makes the state space one-dimensional scalar-valued, instead of vector-valued, of maximum size. This state space is bounded by M×T, where M is the maximum possible volume booked for any type. In this way, the construction of the value function VF(x, t) becomes simplified. In some examples, therefore, the decision to accept or reject the cargo booking is generated based on the decision rule D2S, which is shown in Equation 9 below. For instance, the decision generator 224 may be programmed to generate a result of the decision rule D2S.

$$D2V{:}R(f_\theta(bkvol_i))+VF(x+f_\theta(bkvol_i),t-1)>VF(x,t-1) \quad (9)$$

To help illustrate how dynamic programming is used to form the value equation, an example situation is shown in Table 1 below. It is assumed that there are two cargo types: type 1 and type 2. Both types can arrive for a booking with a probability of 0.4 in any time step and the probability that no shipment will arrive for any booking is 0.2. The revenue for type1 is 1 and for type2 is 2, while the volume for both types is fixed at 1 unit each. Recall that time is labeled in a reverse order, such that departure time is zero and the booking horizon extends up to time t=4. To compute the value function VF, a procession backwards for each state x may be performed. At this point, the state is a two-dimensional vector $x=(x_1, x_2)$, where $x_1$ and $x_2$ are the number of bookings of type1 and type2 respectively. In this example, the vector x may be collapsed into $x=x_1\overline{v}_1+x_2\overline{v}_2=x_1+x_2$ since it is assumed that the volume booked has a value of 1. The different values of x are shown as rows in Table 2 below for the value function according to the situation shown in Table 1. An example computation of VF(1,2) is shown below Table 2.

TABLE 1

| | | type 1 | type 2 |
|---|---|---|---|
| 1 | volume | 1 | 1 |
| 3 | revenue (p) | 1 | 2 |
| 4 | prob. arrival in t | 0.4 | 0.4 |
| 5 | prob. no booking in t | 0.2 | |
| 6 | max capacity ($k_v$) | 2 | |

TABLE 2

| | t = 0 | t = 1 | t = 2 | t = 3 | t = 4 |
|---|---|---|---|---|---|
| x = 0 | 0.0 | 1.2 | 2.4 | 3.1 | 3.6 |
| x = 1 | 0.0 | 1.2 | 1.8 | 2.2 | 0.0 |
| x = 2 | 0.0 | 0.4 | 0.8 | 0.0 | 0.0 |
| x = 3 | −1.0 | −0.6 | 0.0 | 0.0 | 0.0 |
| x = 4 | −2.0 | 0.0 | 0.0 | 0.0 | 0.0 |

$$VF(1, 2) = 0.4\max(1 + VF(2, 1), \ VF(1, 1)) +$$
$$0.4*\max(2 + VF(2, 1), \ VF(1, 1) + 0.2*VF(1, 1)) =$$
$$0.4*(1 + 0.4) + 0.4*(2 + 0.4) + 0.2*1.2 = 1.76 \approx 1.8$$

In some aspects of the present disclosure, the generated decision to accept or reject a booking may be a suggestion or an actionable decision that an operator (e.g., an airline employee) may consider when the user makes an independent decision of whether to accept or reject the booking. For instance, the decision generator 224 may be programmed to generate a message or an actionable decision that is displayed on the display 216. The message may be text that informs the operator of the generated decision. An actionable decision may inform the operator of the generated decision and also enable the operator to execute the generated decision by interacting with the actionable decision (e.g., selecting a link or computer-generated button). In other aspects of the present disclosure, the generated decision to accept or reject a booking may automatically accept or reject the booking without further input from an operator.

For example, the decision generator 224 may be programmed to automatically accept or reject a particular cargo booking based on the decision that is generated. This automatic decision may occur shortly after receiving the particular cargo booking or may occur at a point in time closer to the cargo departure day.

In at least one example, the decision generation may be adjusted for various business objectives. For example, the predictive modeling and decision generation rule may be designed so that excess overbooking incurs a negative penalty (e.g., offloading), while underbooking is not penalized (e.g., VF(x, 0) is zero when the total volume is less than the flight capacity). In such examples, it may be more beneficial to reduce the risk of offloading by using a predictive model that may over predict cargo volume that will be received, which leads to less shipments getting accepted. In other examples, the predictive model may be designed to under predict cargo volume that will be received so that flights are more often at full capacity than they are not. Other business objectives may result in similarly suitable adjustments to the predictive modeling and decision generation.

Figure 4:
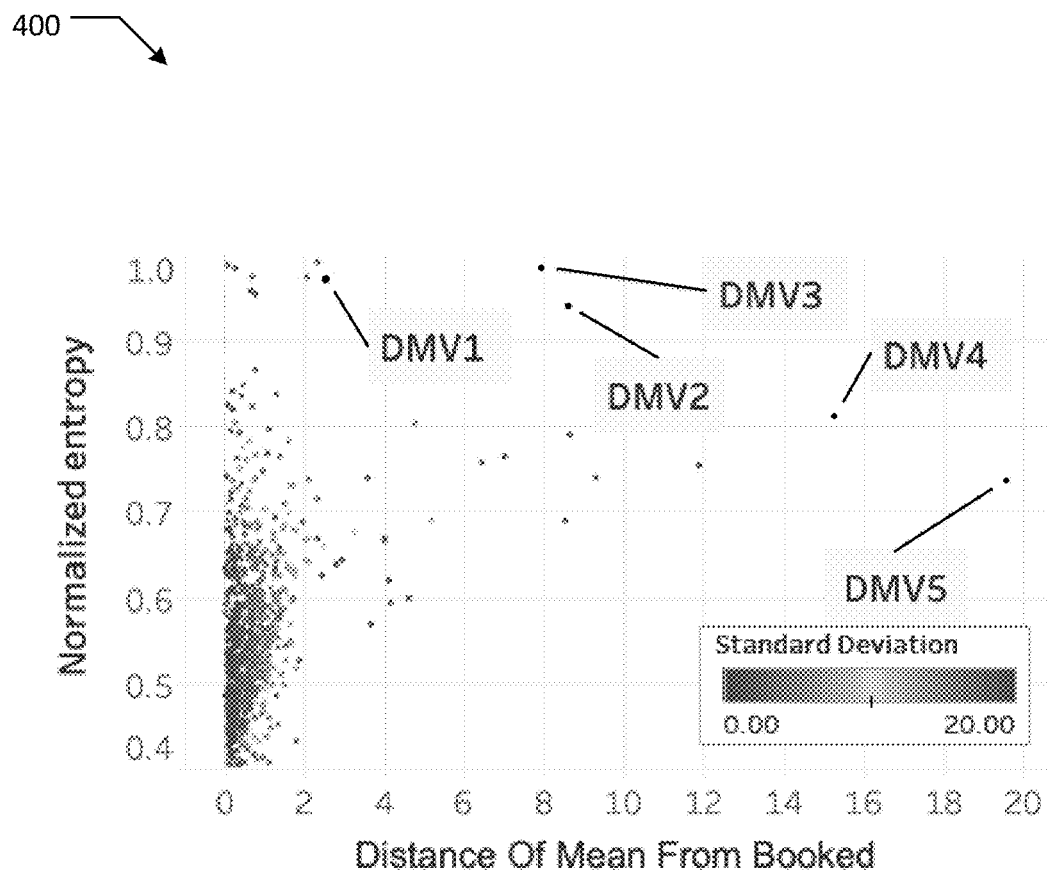
FIG. 4 illustrates a graph showing identified disguised missing values.

FIG. 4 illustrates a graph 400 showing identified disguised missing values based on applying Equations 3 and 4 above to cargo booking data (e.g., the booking data 214). The graph maps each distinct value from the booking data into a two-dimensional feature space so that predetermined threshold values for $g_1$ and $g_2$ may be visually determined. For instance, the graph 400 may be used to identify DMVs from an initial set of booking data to populate the DMV database 212. Every value that crosses the determined thresholds is identified as a DMV. For example, the values DMV1, DMV2, DMV3, DMV4, and DMV5 are identified as DMVs in the graph 400.

Figure 5:
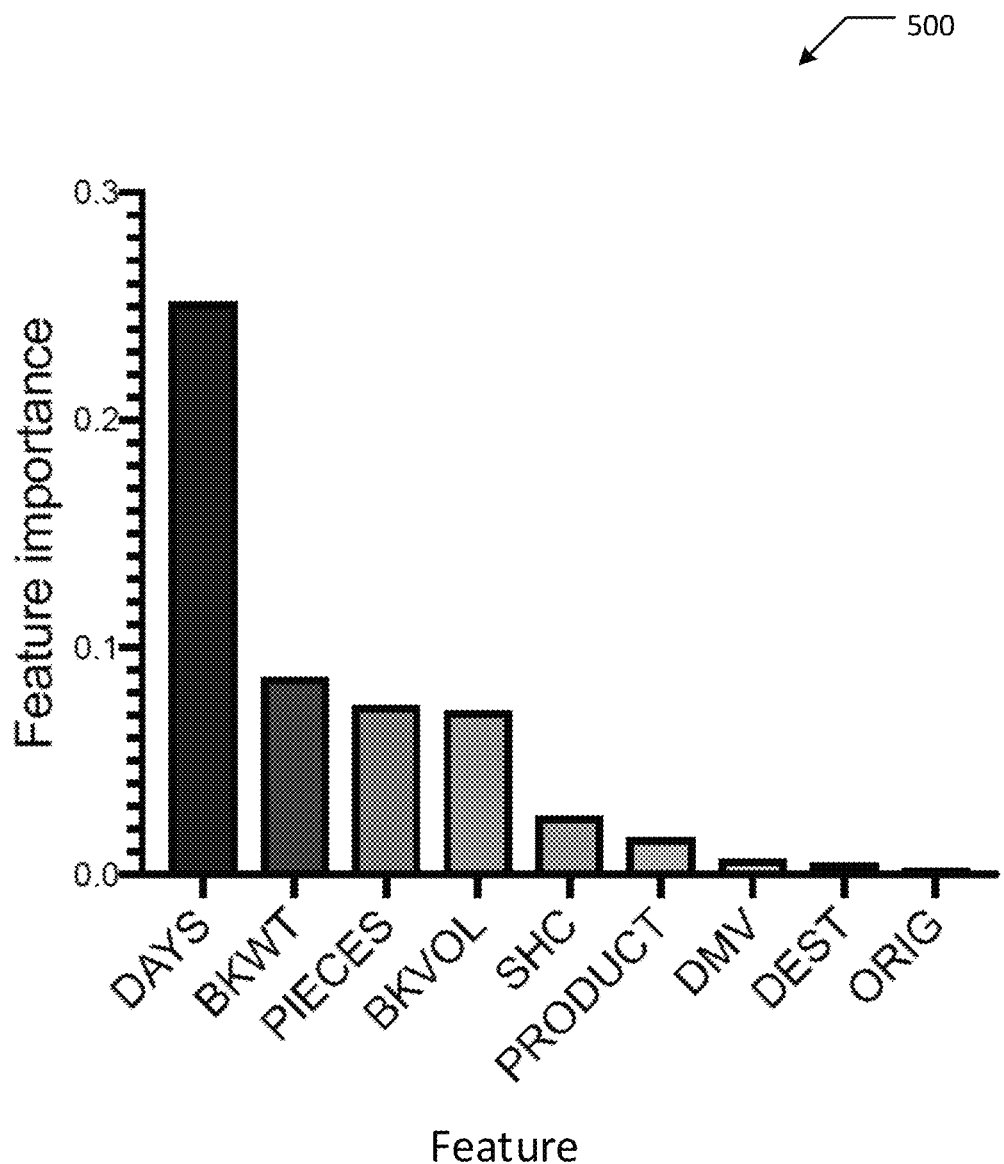
FIG. 5 illustrates a graph showing the importance of features utilized in determining a predicted cargo volume, according to an aspect of the present disclosure.

FIG. 5 illustrates a graph 500 showing the importance the inventors have found of features that may be included in the prediction model described above. DAYS refers to the quantity of days until the cargo departure day. BKWT refers to the booked cargo weight. PIECES refers to the quantity of items in the booked cargo volume. BKVOL refers to the booked cargo volume. SHC refers to the shipment code. PRODUCT refers to the product type. DMV refers to whether a booked cargo volume is flagged as a DMV. DEST refers to the cargo destination. ORIG refers to the cargo origin. For categorical features, such as the product type, the value of the category with the maximum important is illustrated in the graph 500. The importance of each feature may be taken into account when weighting the effect of each feature in the prediction model. As seen in the graph 500, the inventors have found that the quantity of days until the cargo departure day is the most important feature by a significant margin as compared to the differences between the other features.

Validation Data

To validate the advantages of the presently disclosed cargo revenue management system and method, the inventors tested the system using two years of cargo booking data from an airline company. Each booking record consists of several attributes including: booking date, origin, destination, agent, booking volume (bkvol), cargo type, received date, departure date and time, and received volume (rcsvol). This dataset was used to detect DMVs and build the machine-learning model for predicting rcsvol using all other attributes. Simulated data was used for the revenue and offload cost information to evaluate the decisions generated by the provided system. To create the simulations from the real dataset, probabilities $p_i$ of the product types from the real dataset were computed for each type i as shown in Equation 10 below.

$$p_i = \frac{\text{\# bookings with product } i}{\text{\# total bookings}} \quad (10)$$

The related probabilities of the ten most frequent cargo types are shown in Table 3 below. It was observed that the cargo type frequencies are skewed, with the most frequent cargo type having a probability of 0.856. The booking horizon was split into sixty equal time steps and the probability of a booking arriving at time step t was computed by Equation 11 below. A single probability for six different intervals of time steps was computed, resulting in ten time steps per interval. For each interval an average of the ten single time steps was taken that belong to this interval. The results are shown in Table 4 below. Given the probability $p_i$ of an incoming type i at any time, and the probability $p_t$ of getting any type of booking at time t, the probability of getting a booking of product type i at time t is $p_{i,t}=p_ip_t$.

TABLE 3

| Cargo Type | Type1 | Type2 | Type3 | Type4 | Type5 | Type6 | Type7 | Type8 | Type9 | Type10 |
|---|---|---|---|---|---|---|---|---|---|---|
| $p_i$ | 0.856 | 0.042 | 0.036 | 0.035 | 0.012 | 0.007 | 0.005 | 0.003 | 0.002 | 0.002 |

$$p_t = \frac{\text{\# shipments at time } t}{\text{\# shipments in dataset}} \quad (11)$$

TABLE 4

| Time Period | 1-10 | 11-20 | 21-30 | 31-40 | 41-50 | 51-60 |
|---|---|---|---|---|---|---|
| $p_t$ | 0.05 | 0.03 | 0.009 | 0.004 | 0.003 | 0.005 |

The provided system was first evaluated in terms of revenue benefits and offload costs. The value function VF(x, t) table was computed by using the entire dataset and taking the average booking volume for each time step. Then, two different test cases were considered in order to evaluate the advantage of the provided system that combines predictive modeling with decision making. In the first test case, no predictive modeling was done. The decision of whether to accept or reject an incoming booking by applying D2S was based on the reported booked cargo volume, i.e., $f_\theta(bv_i)=bv_i$. Final offloading cost was then calculated based on the received cargo volume. In the second test case, the received bookings were processed for DMV identification and the presently disclosed predictive modeling generated a predicted cargo volume that could be expected to be received.

The decision of whether to accept or reject an incoming booking by applying D2S was based on the predicted cargo volume.

Figures 6A, 6B:
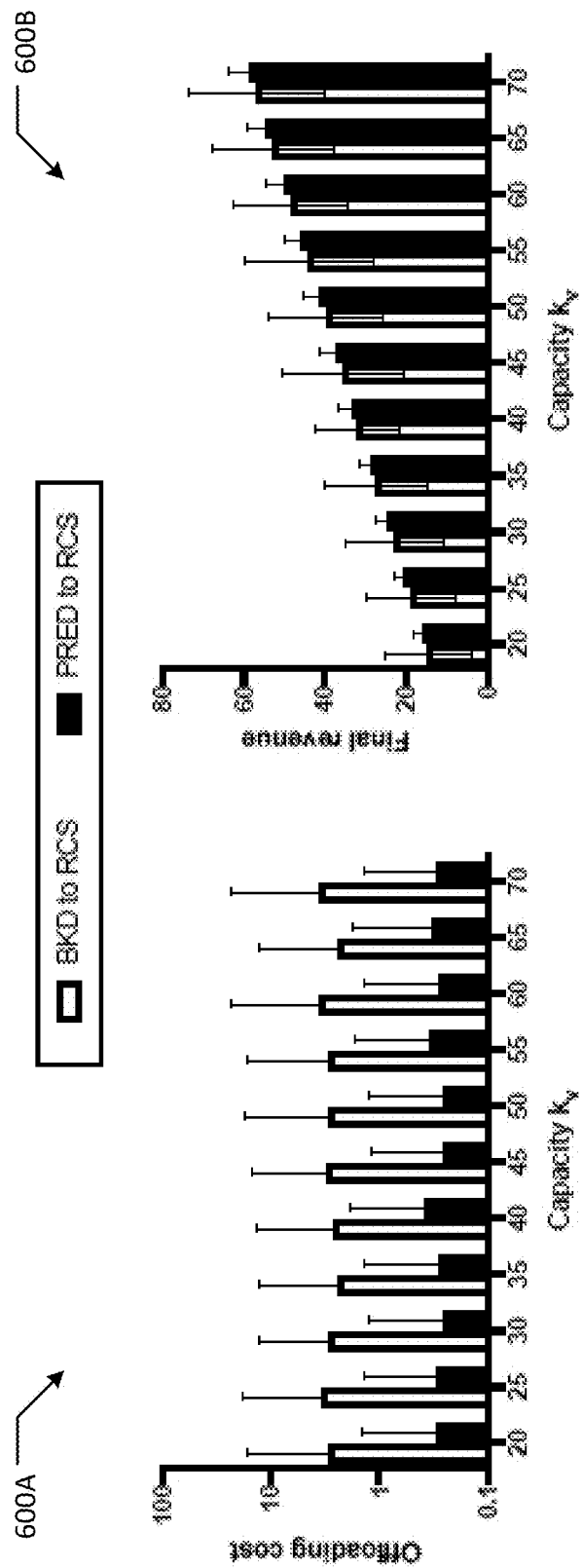
FIG. 6A illustrates a graph showing comparison data between utilizing booked cargo volumes and utilizing predicted cargo volumes with respect to offloading costs at various capacities.
FIG. 6B illustrates a graph showing comparison data between utilizing booked cargo volumes and utilizing predicted cargo volumes with respect to final revenue at various capacities.

At each time step, bookings were drawn from the dataset following the probabilities of Table 3 and applying the decision rule D2S. FIGS. 6A and 6B show the results of eleven different flight capacities $k_v$ and ten thousand flights each, for a total of 220 thousand flights. In particular, FIG. 6A illustrates a graph 600A showing comparison data between utilizing booked cargo volumes and utilizing predicted cargo volumes with respect to offloading costs at the eleven capacities. The graph 600A shows that for various capacity constraints ($k_v$) the offloading cost is lower almost by a factor of ten and with a much lower standard deviation. This suggests that using the predictive modeling of the provided system instead of booked volume not only reduces the offloading cost but adds substantial amount of certainty into the whole air cargo booking process.

FIG. 6B illustrates a graph 600B showing comparison data between utilizing booked cargo volumes and utilizing predicted cargo volumes with respect to final revenue at the eleven capacities. It was observed that the revenue increases when using the predictive modeling of the provided system, indicating that the decision function selected better-value shipments during the booking time horizon. Additionally, the standard deviation of the revenue is lower when using the presently disclosed system, thus providing increased certainty to the air cargo booking process. In this example, the predictive model of the system was designed such that it may over predict cargo volumes, leading to less shipments getting accepted.

The predictive model and the decision generation of the provided system were then evaluated. To evaluate the predictive model, a 3-fold cross-validation was used on the dataset of two years of cargo bookings. A prediction was made on each single booking and the aggregated flight leg predicted volume vs. the flight-leg received volume was evaluated. Cross-validation was implemented so that all the bookings from the same flight leg are kept in the same split. Based on grid-search results, the XGBoost regressor was set with 0.9 subsample ratio of columns for each split, 300 estimators, a maximum tree depth of 20, and a learning rate of 0.05. All other parameters were set as default.

Figure 7:
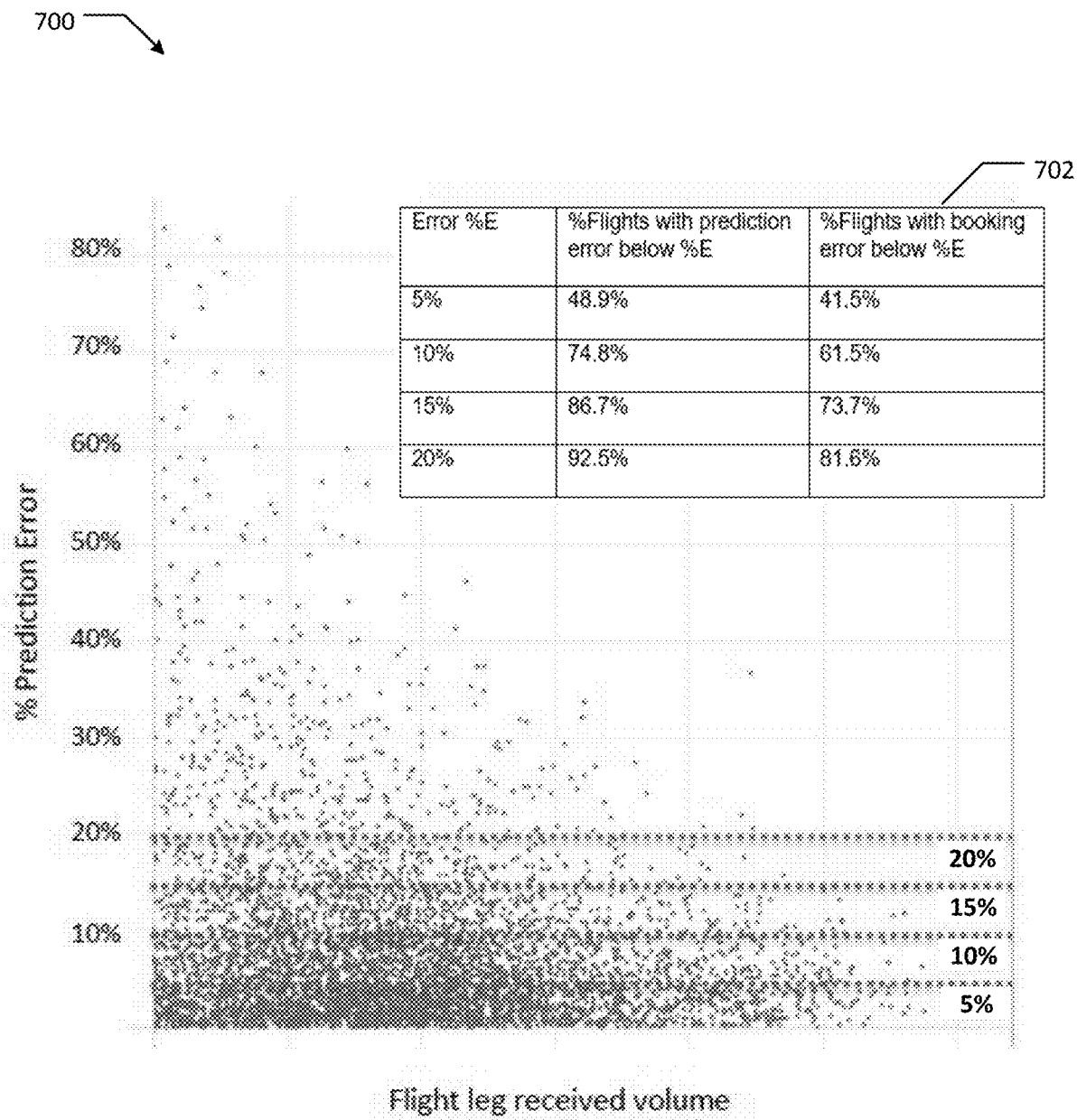
FIG. 7 illustrates a scatter plot of flight data utilizing the presently disclosed system showing error percentage of predicted cargo volumes as compared to received cargo volumes, according to an aspect of the present disclosure.

The mean relative absolute error e shown in Equation 12 below was used on the predictive model of the provided system. The average error on the entire historical data was 7.8%. FIG. 7 illustrates a scatter plot 700 showing error percentage of predicted cargo volumes as compared to received cargo volumes. The scatter plot 700 shows that the prediction error is under 5% in almost half of the flights, while it is under 10% for 74.8% of the flights. The table 702 illustrated in FIG. 7 shows this data. It was observes that by using the provided system's predictive model instead of the actual booked volume values, a greater number of flights have a small error. It is also noteworthy that the prediction error is lower for higher capacity flights, where it has the biggest impact.

$$e = \frac{1}{N}\sum_{1}^{N} \frac{|rcsvol_i - f_\theta(bkvol_i)|}{rcsvol_i} \quad (12)$$

Table 5 below shows the benefits of the provided system's prediction on the shipment level for the ten most frequent cargo types. Specifically, it shows the decrease in percentage of the prediction error (predicted rcsvol vs. actual rcsvol) from the booking error (original booked volume vs. actual rcsvol). The predicted volume decreased the error considerably for nine out of the ten cargo types. The cargo type9 was a rare cargo type that did not have enough data to train the predictive model. Because cargo type9 was rare it did not influence the total flight-leg predicted volume.

TABLE 5

| Product type | % of booking | % error decrease from bkvol |
| --- | --- | --- |
| Type1 | 73.3% | −33.4% |
| Type2 | 10.1% | −38.3% |
| Type3 | 3.7% | −61.9% |
| Type4 | 3.5% | −66.9% |
| Type5 | 3.1% | −34.1% |
| Type6 | 2.7% | −7.2% |
| Type7 | 1.4% | −43.9% |
| Type8 | 0.8% | −96.6% |
| Type9 | 0.7% | +25.8% |
| Type10 | 0.1% | −30.7% |

To evaluate the decision generation of the provided system isolated from the predictive modeling, predictions were not made, but rather decisions were made based on the mean value $\bar{v}_i$. Offloading was determined based on the random number generated by a lognormal distribution, which leads to a decision rule of D3S: $R(\bar{v}_i) + VF(x + \bar{v}_{i,t} - 1) > VF(x, t-1)$. The decision rule D3S was evaluating by comparing it with a first-come first-served (FCFS) policy. In the FCFS policy, every incoming booking is accepted until the capacity runs out. FCFS is a greedy strategy in the sense that it will accept immediate revenue instead of waiting for a potential booking from which more revenue can be made. In an ideal setting, if the booking value was equal to the received value, FCFS will not incur any offloading costs. However, since the two values are rarely the same, the natural advantage of FCFS is not realized and the experiments reveal this. The decision rule D3S and the FCFS strategy were compared based on a simulated data set created using the mean volume $\mu_k$ for each cargo type k of the 24 categories and the related probability distributions. Simulated data was created for ten thousand different simulations. Mean value is used as booked volume, while the received volume is drawn from a lognormal distribution with mean equal to the booked volume and variance $(\theta\mu_k)^2$.

Results in Table 6 below show how the decision generation of the provided system has a benefit not only for the expected revenue but also the final revenue after the offloading cost is deducted. As the variance increases, offloading increases and revenue decreases, which suggests that the provided system can better handling the booking decision making process as compared to the FCFS approach.

TABLE 6

| | Expected revenue | | Revenue after offloading | |
| --- | --- | --- | --- | --- |
| θ | D1S | FCFS | D1S | FCFS |
| 0.8 | 2927.87 | 2548.95 | 2584.28 | 2541.32 |
| 1.0 | 2927.87 | 2548.95 | 2553.74 | 2517.23 |

Table 7 below provides the last sixteen steps in the booking horizon for one of the flight simulations in the simulated dataset. In particular, it shows how, in practice, the decision rule D3S keeps overbooking if the revenue rate is advantageous, while rejecting the less profitable shipments once the capacity is reached. This leads to the accumulation of offloading cost with the ultimate goal of maximizing the revenue.

TABLE 7

| | | Revenue | FCFS | | D1S | |
|---|---|---|---|---|---|---|
| t | bkvol | rate | Load | Decision | Load | Decision |
| 45 | 55.0 | 0.69 | 2759.0 | accepted | 2759.0 | accepted |
| 46 | 59.0 | 0.79 | 2814.0 | accepted | 2814.0 | accepted |
| 47 | 52.0 | 0.72 | 2873.0 | accepted | 2873.0 | accepted |
| 48 | 30.0 | 1.12 | 2925.0 | accepted | 2925.0 | accepted |
| 49 | 59.0 | 0.54 | 2955.0 | rejected | 2955.0 | rejected |
| 50 | 119.0 | 0.98 | 2955.0 | rejected | 2955.0 | accepted |
| 51 | 30.0 | 1.12 | 2955.0 | rejected | 3074.0 | accepted |
| 52 | 30.0 | 1.12 | 2955.0 | rejected | 3104.0 | accepted |
| 53 | 30.0 | 1.12 | 2955.0 | rejected | 3134.0 | accepted |
| 54 | 52.0 | 0.8 | 2955.0 | rejected | 3164.0 | rejected |
| 55 | 27.0 | 0.8 | 2955.0 | rejected | 3164.0 | rejected |
| 56 | 52.0 | 0.8 | 2955.0 | rejected | 3164.0 | rejected |
| 57 | 125.0 | 0.69 | 2955.0 | rejected | 3164.0 | rejected |
| 58 | 30.0 | 1.12 | 2955.0 | rejected | 3164.0 | accepted |
| 59 | 30.0 | 1.12 | 2955.0 | rejected | 3194.0 | accepted |
| 60 | 30.0 | 1.12 | 2955.0 | rejected | 3224.0 | accepted |

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein and in the appended claims, the singular form of a word includes the plural, unless the context clearly dictates otherwise. Thus, the references "a," "an" and "the" are generally inclusive of the plurals of the respective terms. For example, reference to "an airline" or "a cargo type" includes a plurality of such "airlines" or "cargo types." The term "and/or" used in the context of "X and/or Y" should be interpreted as "X," or "Y," or "X and Y."

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A system for managing cargo bookings, the system comprising:
    a memory; and
    a processor in communication with the memory, the processor configured to:
        receive a cargo booking including a booked cargo volume and a booked cargo weight, wherein the cargo booking is received a quantity of days until a cargo departure day,
        determine whether the booked cargo volume is a disguised missing value,
        determine, using a machine-learning model, a predicted cargo volume of the cargo booking based on a set of features of the cargo booking that include at least whether the booked cargo volume is a disguised missing value, the booked cargo weight, and the quantity of days until the cargo departure day, and
        generate a decision to accept or reject the cargo booking based in part on the predicted cargo volume,
    wherein the memory stores a database of identified disguised missing values, and wherein determining whether the booked cargo volume is a disguised missing value includes comparing the booked cargo volume to the database of identified disguised missing values,
    wherein the processor is further configured to identify new disguised missing values based on a deviation of an average received cargo volume for a particular booked cargo volume from the particular booked cargo volume exceeding a first predetermined threshold,
    wherein the deviation $g_1$ is defined by the following equation:

$$g_1(u_i) = \left(\frac{1}{n_i}\sum_{k=1}^{n_i} v_{i,k} - u_i\right)^2,$$

wherein
    $u_i$ is the particular booked cargo volume,
    $v_{i,k}$ is a respective received cargo volume for the particular booked cargo volume, and
    $n_i$ is a quantity of received cargo volumes for the particular booked cargo volume,
    wherein the machine-learning model is trained using previous booking data comprising previous cargo bookings, a previous booking volume for each of the previous cargo bookings, and a previous received volume for each of the previous cargo bookings,
    wherein the machine-learning model is built using one or more gradient boosting machines, wherein the one or more gradient boosting machines are configured to use ensemble methods that build shallow trees in a sequential manner in which each subsequent tree is trained by using a dependent variable as a residual of a previous tree.

2. The system of claim 1, wherein the processor is further configured to:
    update the database of disguised missing values as new disguised missing values are identified.

3. The system of claim 2, wherein the new disguised missing values are identified also based on an entropy of the received cargo volumes for the particular booked cargo volume exceeding a second predetermined threshold.

4. The system of claim 3, wherein the entropy $g_2$ is defined by the following equation:

$$g_2(u_i) = \frac{-\sum_{k=1}^{K} p_k \log p_k}{\log n_i}, \text{ wherein } p_k = \frac{|V_{1,k}|}{|V_i|},$$

and wherein
- $u_i$ is the particular booked cargo volume,
- $V_i$ is a set of received cargo volumes for the particular booked cargo volume,
- K is a quantity of distinct elements of $V_i$, and
- $n_i$ is a quantity of received cargo volumes for the particular booked cargo volume.

5. A method for managing cargo booking, the method comprising:
  receiving a cargo booking including a booked cargo volume and a booked cargo weight, wherein the cargo booking is received a quantity of days until a cargo departure day,
  determining whether the booked cargo volume is a disguised missing value,
  determining, using a machine-learning model, a predicted cargo volume of the cargo booking based on a set of features of the cargo booking that include at least whether the booked cargo volume is a disguised missing value, the booked cargo weight, and the quantity of days until the cargo departure day,
  generating a decision to accept or reject the cargo booking based in part on the predicted cargo volume,
  wherein determining whether the booked cargo volume is a disguised missing value comprises comparing the booked cargo volume to a database of identified disguised missing values,
  wherein the method further comprises identifying new disguised missing values based on a deviation of an average received cargo volume for a particular booked cargo volume from the particular booked cargo volume exceeding a first predetermined threshold,
  wherein the deviation $g_1$ is defined by the following equation:

$$g_1(u_i) = \left( \frac{1}{n_i} \sum_{k=1}^{n_i} v_{i,k} - u_i \right)^2,$$

wherein
- $u_i$ is the particular booked cargo volume,
- $v_{i,k}$ is a respective received cargo volume for the particular booked cargo volume, and
- $n_i$ is a quantity of received cargo volumes for the particular booked cargo volume,
  wherein the machine-learning model is trained using previous booking data comprising previous cargo bookings, a previous booking volume for each of the previous cargo bookings, and a previous received volume for each of the previous cargo bookings,
  wherein the machine-learning model is built using one or more gradient boosting machines, wherein the one or more gradient boosting machines are configured to use ensemble methods that build shallow trees in a sequential manner in which each subsequent tree is trained by using a dependent variable as a residual of a previous tree.

6. The method of claim 5, wherein the set of features further includes one or more of the group consisting of: a quantity of items in the booked cargo volume, the booked cargo volume, a shipment code, a cargo type, a cargo destination, and a cargo origin.

7. The method of claim 5, wherein each feature of the set of features includes a significance factor for determining the predicted cargo volume, and wherein the quantity of days until the cargo departure day from receiving the cargo booking has the greatest significance factor.

8. The method of claim 7, wherein the booked cargo weight has the second greatest significance factor.

9. The method of claim 5, wherein generating the decision is based on maximizing an expected revenue of a total cargo volume including a plurality of cargo bookings.

10. The method of claim 9, wherein the total cargo volume is a fixed volume.

11. The method of claim 9, wherein a decision to accept the cargo booking is generated if a sum, of a value of accepting the predicted cargo volume and the expected revenue by accepting the predicted cargo volume, is greater than a value of rejecting the predicted cargo volume.

12. The method of claim 11, wherein the value of accepting or rejecting the predicted cargo volume is defined by the following recursive function:

$$VF(x,t) = \sum_{i=1}^{m} p_{i,t} \max\{R(\bar{v}_i) + VF(x+e_i, t-1), VF(x, t-1)\} + p_{0,t} VF(x, t-1),$$

wherein
- t=1, 2, ..., T, wherein x is a state vector $(x_i, \ldots, x_m)$, and wherein
- t is a quantity of days remaining until the cargo departure day,
- T is the quantity of days from receiving the cargo booking until the cargo departure day,
- i is a quantity of cargo types in the total cargo volume,
- $x_i$ is each respective cargo type of the quantity of cargo types,
- $R(\bar{v}_i)$ is the expected revenue by accepting the predicted cargo volume,
- $p_{i,t}$ is a probability of a cargo type i arriving at time t, and
- $e_i$ is a one-hot binary vector with a 1 at the i-th location.

13. The method of claim 12, wherein the decision is generated based on the following relationship:

$$R(f_\theta(bkvol_i)) + VF(x+e_i, t-1) > VF(x, t-1), \text{ wherein}$$

- $R(f_\theta(bkvol_i))$ is the expected revenue by accepting the predicted cargo volume,
- $f_\theta(bkvol_i)$ is the predicted cargo volume,
- $VF(x+e_i, t-1)$ is the value of accepting the predicted cargo volume, and
- $VF(x, t-1)$ is a value of rejecting the predicted cargo volume.

14. The method of claim 12, wherein the decision is generated based on the following relationship:

$$R(f_\theta(bkvol_i)) + VF(x+f_\theta(bkvol_i), t-1) > VF(x, t-1),$$
$$\text{wherein } x = \sum_i x_i \bar{v}_i$$

wherein
- $\bar{v}_i$ is a respective received cargo volume,
- $R(f_\theta(bkvol_i))$ is the expected revenue by accepting the predicted cargo volume,
- $f_\theta(bkvol_i)$ is the predicted cargo volume,
- $VF(x+e_i, t-1)$ is the value of accepting the predicted cargo volume, and
- $VF(x, t-1)$ is a value of rejecting the predicted cargo volume.

15. A non-transitory, computer-readable medium storing instructions which, when performed by a processor, cause the processor to:
  receive a cargo booking including a booked cargo volume and a booked cargo weight, wherein the cargo booking is received a quantity of days until a cargo departure day,
  determine whether the booked cargo volume is a disguised missing value, determine, using a machine-learning model, a predicted cargo volume of the cargo booking based on a set of features of the cargo booking that include at least whether the booked cargo volume is a disguised missing value, the booked cargo weight, and the quantity of days until the cargo departure day, and generate a decision to accept or reject the cargo booking based in part on the predicted cargo volume, wherein determining whether the booked cargo volume is a disguised missing value comprises comparing the booked cargo volume to a database of identified disguised missing values, wherein the non-transitory, computer-readable medium further stores instructions which, when performed by the processor, cause the processor to identify new disguised missing values based on a deviation of an average received cargo volume for a particular booked cargo volume from the particular booked cargo volume exceeding a first predetermined threshold, wherein the deviation $g_1$ is defined by the following equation:

$$g_1(u_i) = \left(\frac{1}{n_i}\sum_{k=1}^{n_i} v_{i,k} - u_i\right)^2,$$

wherein $u_i$ is the particular booked cargo volume, $v_{i,k}$ is a respective received cargo volume for the particular booked cargo volume, and $n_i$ is a quantity of received cargo volumes for the particular booked cargo volume, wherein the machine-learning model is trained using previous booking data comprising previous cargo bookings, a previous booking volume for each of the previous cargo bookings, and a previous received volume for each of the previous cargo bookings, wherein the machine-learning model is built using one or more gradient boosting machines, wherein the one or more gradient boosting machines are configured to use ensemble methods that build shallow trees in a sequential manner in which each subsequent tree is trained by using a dependent variable as a residual of a previous tree.

16. The non-transitory, computer-readable medium of claim 15, wherein generating the decision includes automatically accepting or rejecting the cargo booking without further input.

* * * * *